Figure 1:
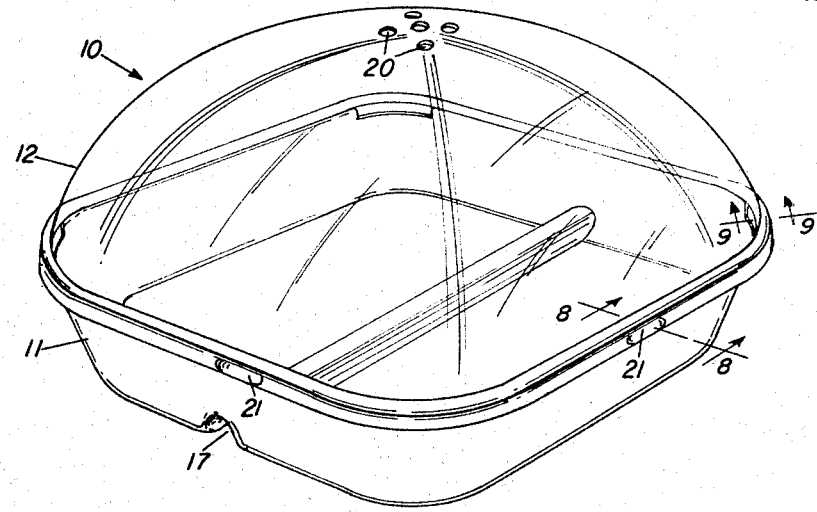

Dec. 3, 1968   J. L. ARTIG   3,413,958
PET ANIMAL SHELTER

Filed Oct. 7, 1966                                3 Sheets-Sheet 1

Dec. 3, 1968 J. L. ARTIG 3,413,958
PET ANIMAL SHELTER
Filed Oct. 7, 1966 3 Sheets-Sheet 2

INVENTOR
JAMES L. ARTIG
BY Beale and Jones
ATTORNEYS

Dec. 3, 1968              J. L. ARTIG              3,413,958

PET ANIMAL SHELTER

Filed Oct. 7, 1966                            3 Sheets-Sheet 3

INVENTOR
JAMES L. ARTIG

BY *Blaland Jones*

ATTORNEYS

United States Patent Office 3,413,958
Patented Dec. 3, 1968

3,413,958
PET ANIMAL SHELTER
James L. Artig, Delwood, Minn., assignor to Artig Products, Inc., a corporation of Minnesota
Continuation-in-part of application Ser. No. 463,291, June 11, 1965. This application Oct. 7, 1966, Ser. No. 585,196
15 Claims. (Cl. 119—15)

This is a continuation-in-part application of my copending application Ser. No. 463,291, filed June 11, 1965, and now Patent No. 3,308,789.

This invention is directed to improvements in a relatively small animal shelter for small pets for use indoors or outdoors.

An object of the invention is to provide a low cost shelter for small creatures such as turtles, lizards, chameleons and mice which are sold in large quantity by pet stores.

Another object of the invention is to provide a shelter for small animals that will permit the owner to view his pet and yet prevent its escape.

A further object of the invention is to provide a small shelter that has a base and a removable top that is transparent and is provided with ventilating access opening between the base and the top and in the peak of the top.

A still further object of the invention is to provide a pet shelter that has a base with a partition portion formed therein that divides the bottom into two areas permitting water for turtles to be kept in one area and sand in the other area so that a turtle may alternately wet and dry himself while for other pets it permits a bed in one part and placement of food in the other part.

Yet a still further object of the invention is to provide a pet shelter having a bottom with a peripheral upper and transversely extending rim and top with a peripheral transversely extending rim seating on the bottom peripheral rim and having a depending skirt portion overhanging the bottom and having a cooperating snap type securement means on the skirt for securing it onto the bottom.

Another object of the invention is to provide a shelter for small animals having a bottom and a removable top, the bottom having a peripheral upper outwardly extending rim that has recesses in the periphery so as to provide vent openings which are protected from drafts or rain by an overhanging peripheral depending skirt on the top received thereover.

Still further objects and the entire scope of applicability of the present invention will become apparent from the detailed description given hereinafter. It should be understood, however, that the detailed description and specific example is given by way of illustration only and, while indicating preferred embodiment of the invention, is not given by way of limitation, since various changes and modifications within the spirit and scope of the invention will become apparent to those skilled in the art from this detailed description.

Figure 2:
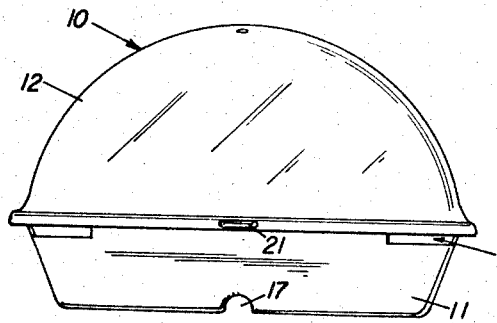
Figure 3:
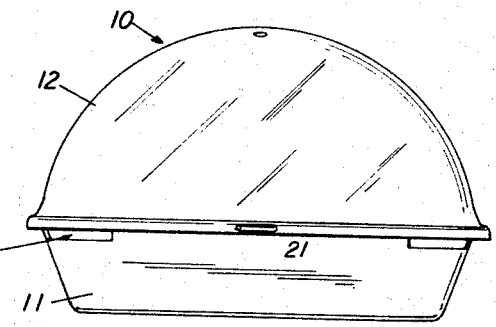
Figure 4:
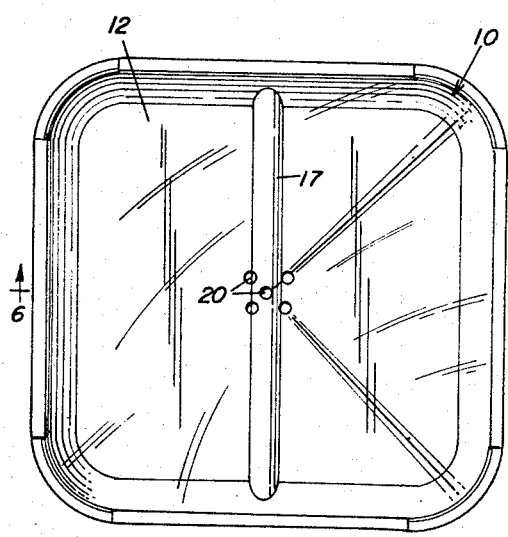
Figure 5:
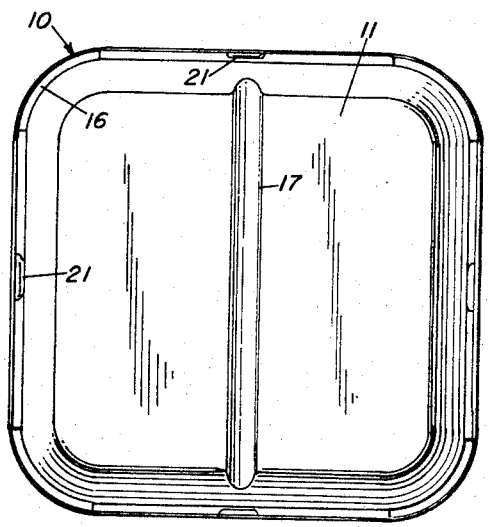
Figure 6:
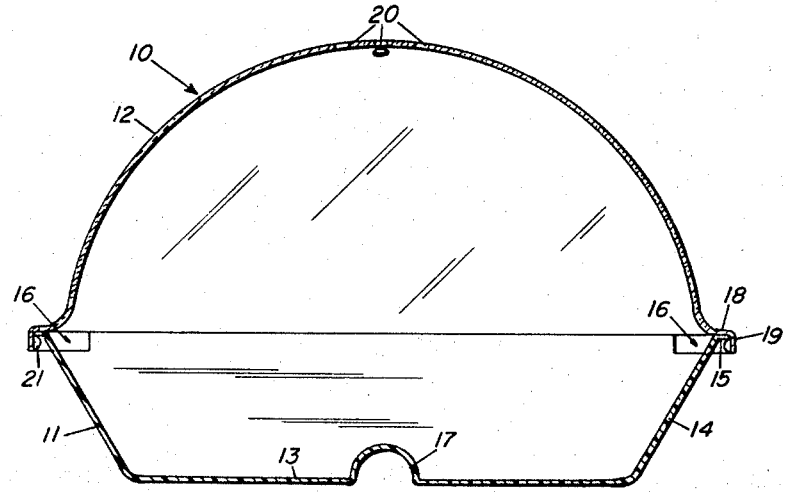
Figure 7:
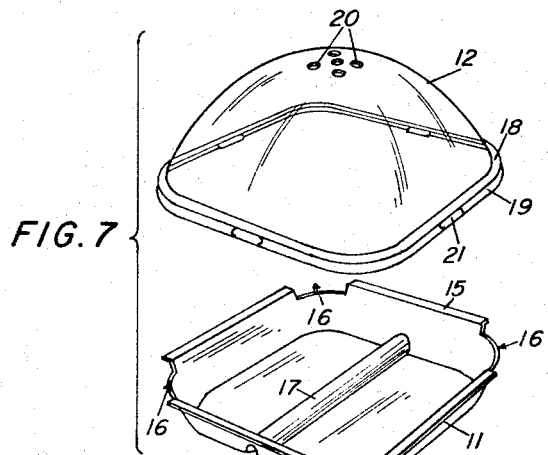
Figure 8:
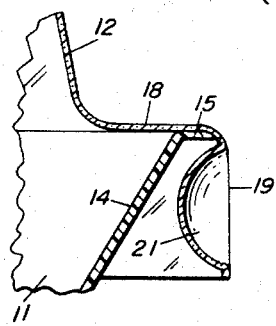
Figure 9:
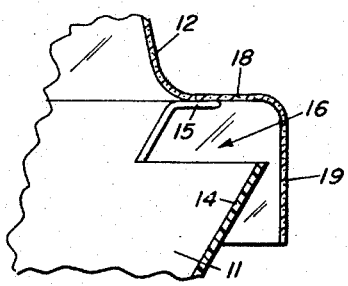
Figure 10:
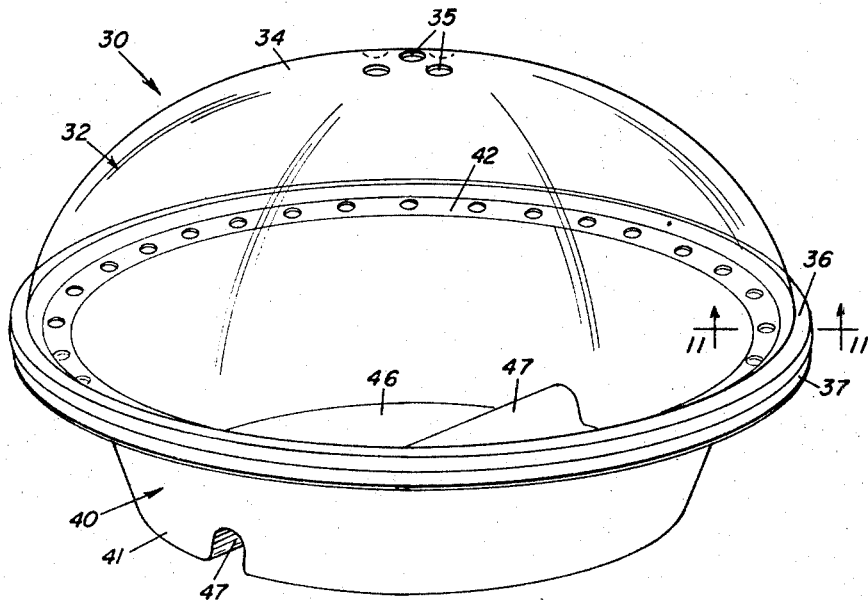
Figure 11:
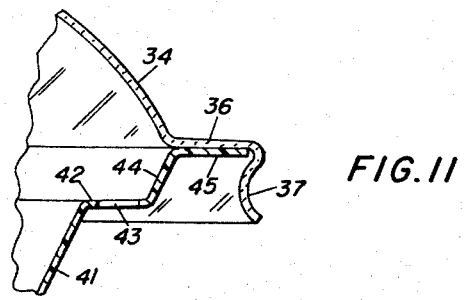
Figure 12:
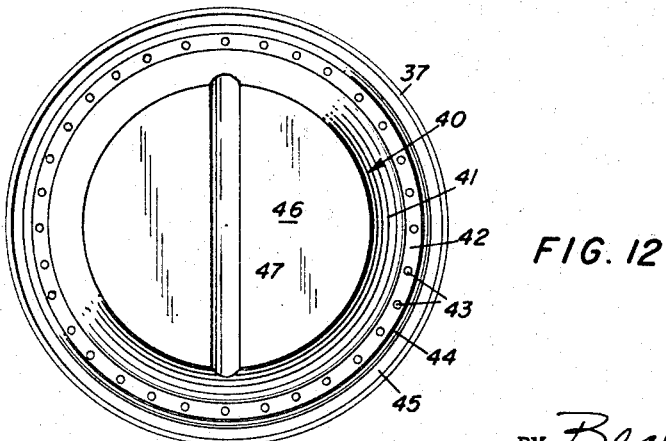

Reference is made to the drawings for a more complete understanding of the invention in which:

FIG. 1 is a perspective view of the animal shelter;
FIG. 2 is a front elevational view of the shelter in FIG. 1;
FIG. 3 is a right-hand elevational view of the shelter in FIG. 2;
FIG. 4 is a top plan view of the shelter in FIG. 2;
FIG. 5 is a top plan view of the bottom of the shelter in FIG. 4 with the top removed;
FIG. 6 is a vertical cross sectional view on line 6—6 of FIG. 4 on an enlarged scale;
FIG. 7 is a perspective exploded view of the shelter in FIG. 1 on a reduced scale;
FIG. 8 is an enlarged sectional view of the snap type securement means of the top to the bottom along line 8—8 of FIG. 1;
FIG. 9 is an enlarged sectional view of the vent opening with overhanging protective skirt of the top along line 9—9 of FIG. 1;
FIG. 10 is a perspective view of a modification of the shelter;
FIG. 11 is a section along line 11—11 of FIG. 10 on an enlarged scale; and
FIG. 12 is a bottom plan view of the shelter in FIG. 10 on a reduced scale.

Throughout the description like reference numbers refer to similar parts.

A shelter according to the invention is generally indicated at 10 and it has a bottom 11 and a top 12. The shelter depicted is about 7½" square with arcuate corners and about 4" high. The bottom 11 is about 1½" high and the top 12 has a matching square shaped bottom with a transparent dome-shaped upper portion.

The bottom 11 may be molded of suitable tough plastic material. It has a flat floor 13, sides 14 that extend upwardly and outwardly at about 130° to the base and terminate in an upper peripheral transversely extending flange 15 approximately ⅛" wide. The sides are cut away in effect at the corners at 16 for a distance of about ⁹⁄₁₆" down from the top from flange 15 so as to provide for ventilation openings. In the base there is formed an inwardly extending protrusion 17 across the middle so as to divide the bottom into two parts. The protrusion or partition 17 is generally semicircular in cross section.

The two parts of the bottom permits for turtles, water to be kept in one and sand in the other, permitting the turtle to alternately wet and dry himself. Also, for other pets it permits a bed in one part and food placement in the other part.

The top 12 is made of transparent plastic material and may have a sector (not shown) that is opaque to provide a shaded area thereneath for the housed pet. The bottom peripheral portion of the top 12 has an outwardly and transversely extending flange 18 about ³⁄₁₆" wide that rests on the transverse flange 15 of the bottom and a depending skirt 19 of about ⁹⁄₁₆" height that fits down over the flange 14. This flange 18 and skirt 19 are shown as respects to the corner in FIG. 9 in spaced relation to the ventilation passage 16 in the bottom member 11. The spaced skirt portion 18–19 of the top at the corners provides for no draft ventilation passageways with the openings 16 in the bottom member. In the peak of the dome shaped top 12 there may be placed additional ventilation small spaced apart apertures 20.

The top 12 has its skirt 19 in the middle of each four sides formed with indented portions 21 that snap beneath the transverse flange 15 on the bottom member 11. In order to install and remove the top from the bottom the thumbs are used on the top and the fingers on the bottom. By pressing together the top is installed on the bottom. To remove the top the sides of the bottom are sprung in and the skirt of the top is pulled out and the top is then lifted off.

The modification shelter generally indicated at 30 as shown in FIGS. 10–12 is round and the top is generally indicated at 32. This top has a dome 34 with spaced apart vent holes 35 in the peak thereof. An outwardly turned flange portion is at the bottom of the top and it has a horizontally extending flange 36 and a downwardly depending skirt 37 that is recessed inwardly forming a securing portion as will be described.

The modification shelter 30 has a cooperating round bottom member generally indicated at 40 that receives the top 32 thereon. The bottom member has a generally flat bottom portion 46 with a portion 47 therein that is formed by an indentation extending upwardly into the bottom.

The bottom 40 has an upwardly projecting wall 41 extending at an obtuse angle to the bottom portion 46. At the upper portion of the wall 46 is a flange portion having a horizontally outwardly extending first flange 42 with ventilation apertures 43 extending in spaced relation upwardly therethrough. An upwardly extending upper wall 44 extends up from the outer peripherial edge 4 of flange 42 and generally parallel to the side wall 41. Extending horizontally outward from the top of upper wall 44 is a second or upper flange 45. It is on this second or upper flange 45 that the flange 36 of the top seats. The indented skirt 37 of the top snaps down over the flange 45 in a removable manner. The skirt 37 extends downward a distance beyond the ventilation apertures 43 and spaced outwardly therefrom so as to provide no draft ventilation upwardly through the ventilation apertures 43.

These shelters may be made in various sizes differing from the size of the one here described. The shelter is light in weight yet may be made of durable plastic material that will withstand the outdoor weather. It is economical to manufacture. It is well ventilated yet is free from impinging drafts. It is adaptable for transporting and housing many small creatures and pets. It affords a safe and secure shelter for pets and at the same time permits full observation of the pets housed therein.

I claim as my invention:

1. An animal shelter comprising in combination, a bottom member and a removable top member, said bottom member having a generally flat base and an upwardly extending side wall, said side wall terminating in its upper edge in a transversely and outwardly extending flange portion having ventilation apertures therein, said top being dome shaped and having a transversely and outwardly extending peripheral bottom flange portion seating on a portion of said transverse flange portion of the bottom member and a depending skirt on said flange of the top member that extends down over the transverse flange portion on the bottom member in spaced relation to said apertures in the bottom member and constituting means providing an overhanging sheltering portion relative to said ventilation apertures for no draft ventilation for said shelter, said depending skirt and said transverse flange on the bottom member having cooperating releasable securing means for holding the top member on the bottom member.

2. An animal shelter according to claim 1 wherein said top member is transparent.

3. An animal shelter according to claim 1 wherein said bottom member has a partition thereacross dividing it into two pairs.

4. An animal shelter according to claim 3 wherein said partition is an elongated indentation extending upwardly into said flat base portion of the bottom member.

5. An animal shelter according to claim 1 wherein said bottom member is generally rectangular and has arcuate corners, said wall extends upwardly at an obtuse angle to said base, said top member has ventilation passages extending upwardly therethrough in its peak and said securing means for the top to the bottom comprise indentations formed in at least two oppositely disposed skirt portions of said top for reception below an adjacent portion of the transverse flange on the bottom member in a snap action manner.

6. An animal shelter according to claim 1 wherein said bottom member is generally rectangular and has arcuate corners, said ventilation apertures in the flange of the bottom member are in said arcuate corners of the bottom member and said skirt of the top member extends in spaced relation to said apertures in said corners of the bottom member whereby the no draft ventilation is provided upwardly underneath said skirt and through said apertures.

7. An animal shelter according to claim 6 wherein said top is of transparent plastic material and the skirt portion is yieldable to be sprung outwardly for installing and removing the top from the bottom member.

8. An animal shelter according to claim 7 wherein said top member has ventilation apertures through its peak portion.

9. An animal shelter according to claim 8 wherein said bottom member has partition means extending thereacross dividing the bottom into at least two parts.

10. An animal shelter according to claim 1 wherein said bottom member is generally round, said wall extends upwardly at an obtuse angle to said base, said flange portion comprising a horizontally extending first flange, an upper wall extending upwardly and outwardly at the outer edge of the first flange and a horizontally extending second flange projecting from the top of the upper wall, said first flange having said ventilation apertures spaced apart and extending therethrough, said bottom flange portion of the top member seating on the second flange of the bottom member and said depending skirt of the top member being in outward spaced relation to said upper wall of the bottom and said ventilation apertures.

11. An animal shelter according to claim 10 wherein said skirt has inwardly projecting portions therein projecting inwardly under the second flange of the bottom and forming said releasable securing means for holding the top member on the bottom member.

12. An animal shelter according to claim 11 wherein said top member is transparent.

13. An animal shelter according to claim 12 wherein said bottom member has a partition thereacross dividing it into two parts.

14. An animal shelter according to claim 13 wherein said partition is an elongated indentation extending upwardly into said flat base portion of the bottom member.

15. An animal shelter according to claim 14 wherein said top member has ventilation apertures through its peak portion.

References Cited

UNITED STATES PATENTS

| | | | |
|---|---|---|---|
| 2,566,453 | 9/1951 | Ketay | 119—37 |
| 3,106,801 | 10/1963 | Risacher | 47—17 |
| 3,121,975 | 2/1964 | Duhamel | 47—17 |
| 3,122,127 | 2/1964 | Shechmeister et al. | 119—18 |
| 3,147,736 | 9/1964 | Daniel | 119—19 |
| 3,211,130 | 10/1965 | Prince | 119—51 |
| 3,269,578 | 8/1966 | Lewis | 119—5 X |
| 3,304,913 | 2/1967 | Nesher | 119—15 |
| 3,308,789 | 3/1967 | Artig | 119—19 |
| 3,367,308 | 2/1968 | Quattrone et al. | 119—15 |
| 3,374,771 | 3/1968 | Michie et al. | 119—5 |

ALDRICH F. MEDBERY, *Primary Examiner.*